United States Patent [19]

Zimmer

[11] Patent Number: 4,999,817
[45] Date of Patent: Mar. 12, 1991

[54] PROGRAMMABLE GAIN CONTROL FOR ROTATING TRANSDUCER ULTRASONIC TOOLS

[75] Inventor: Mark D. Zimmer, Katy, Tex.

[73] Assignee: Halliburton Logging Services Inc., Houston, Tex.

[21] Appl. No.: 483,486

[22] Filed: Feb. 22, 1990

[51] Int. Cl.$^5$ .................................................. G01V 1/40
[52] U.S. Cl. .......................................... 367/65; 367/67; 367/69; 367/98
[58] Field of Search ....................... 367/35, 65, 66, 67, 367/69, 98; 330/278, 280

[56] References Cited

U.S. PATENT DOCUMENTS

| | | | |
|---|---|---|---|
| 3,621,410 | 11/1971 | Badger et al. | 367/66 |
| 4,691,307 | 9/1987 | Rambow | 367/69 |
| 4,727,521 | 2/1988 | Meyer et al. | 367/67 |
| 4,855,965 | 8/1989 | Rambow | 367/69 |

Primary Examiner—Ian J. Lobo
Attorney, Agent, or Firm—William J. Beard

[57] ABSTRACT

A rotary ultrasonic transducer logging tool is set forth which has a transmitter connected to a transducer for transmitting pulses periodically, and a rotor with angle sensor connected thereto. One full revolution is divided into a specified number of incremental steps. The output of the receiver is supplied to an automatic gain control amplifier, then to an analog to digital converter. A gain control setting for the AGC amp is included. The AGC setting for the particular corresponding points in a first revolution of the transducer are used to provide settings for the AGC amplifier in the next revolution. A first buffer is used to store the data for the first revolution, a second buffer for the second revolution, and alternately back to the first buffer. These two buffers provide an output signal for a gain control buffer then input to the AGC amplifier. Alternate forms of gain control signal selection are used such as prior gain control settings.

15 Claims, 1 Drawing Sheet

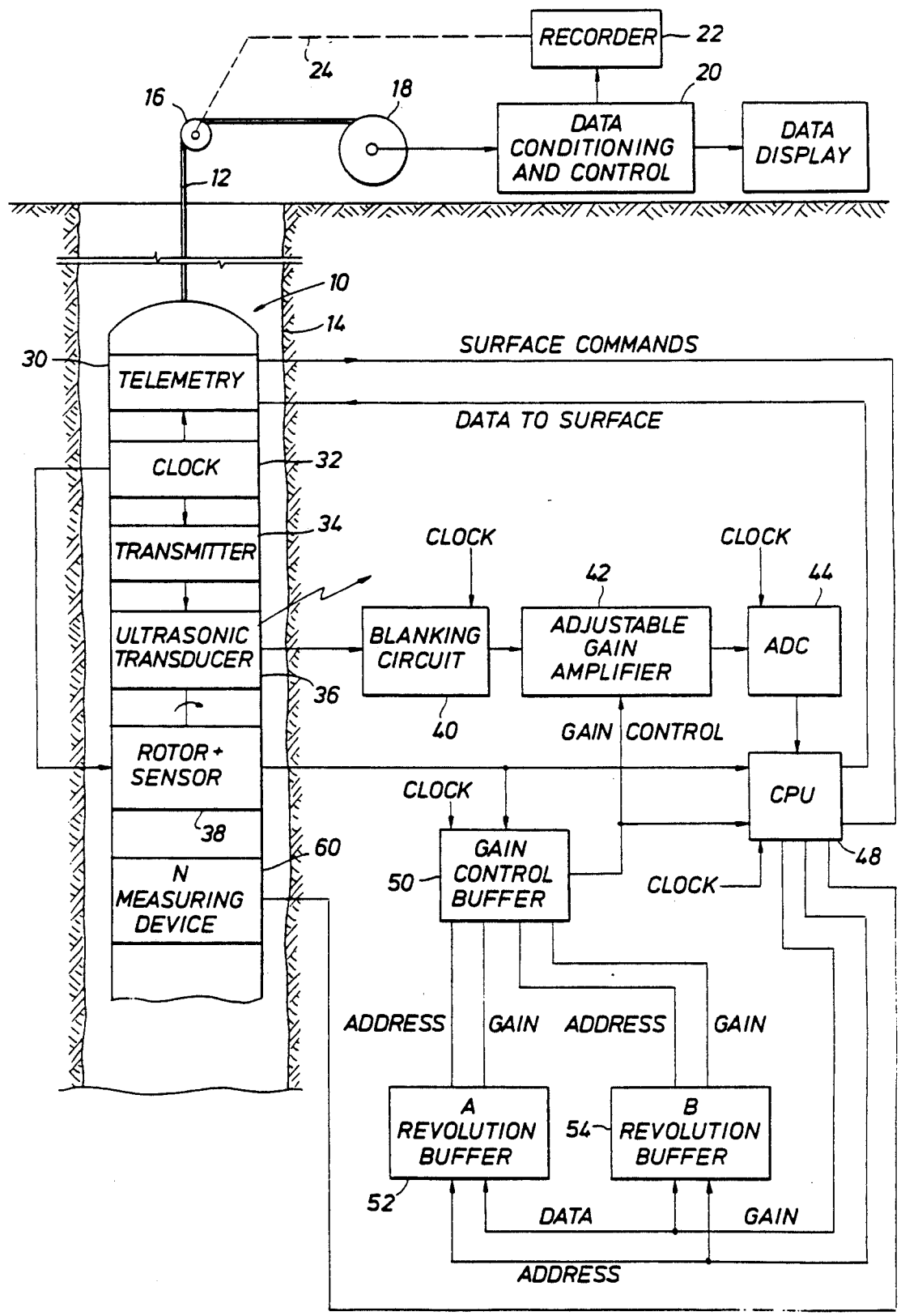

PROGRAMMABLE GAIN CONTROL FOR ROTATING TRANSDUCER ULTRASONIC TOOLS

BACKGROUND OF THE DISCLOSURE

This apparatus is directed to an improved gain control system for a rotating transducer ultrasonic logging tool supported in a sonde and used in a well borehole to conduct ultrasonic logging. An ultrasonic testing device forms an ultrasonic wave which is transmitted directionally from a sonde in a well borehole. Particularly in an open hole (referring to an uncased well borehole), the device can generate tremendous amounts of data, the data flowing from the tool to the surface at the rate of about 1.5 megabytes per second. A typical present day ultrasonic tool fires repetitively, and each pulse on firing is directed differently in azimuth than the previous pulse transmitted by the device. There is a waiting interval while the ultrasonic echo is received back at the transducer which is used both for transmission and reception. The borehole is tested by a constantly rotating ultrasonic transducer operated in a pulsed mode. Presently, an image can be obtained with one inch vertical spacing, and consecutive pulses can be spaced as close as about one degree of azimuthal rotation. Indeed, even closer pulse spacing can be obtained.

As each transmitter pulse is formed, the pulse itself can be used as a timing marker serving as a reference and peak amplitude is also noted. The receiver system must respond dynamically using a gain control amplifier and handle the received signal. The received signal decays over several orders of magnitude. The receiver must have an automatic gain control (AGC) system so that the receiver is not overdriven or the data is otherwise lost because the receiver is providing insufficient gain. In other words, the gain for the receiver must be appropriate for the moment, and this gain typically has the form of a decaying gain correction factor, or decaying AGC signal. For instance, just a few microseconds after the ultrasonic pulse is transmitted, the AGC amplifier is switched so that gain is small because the return signal is quite large. In other instances, the return signal may be quite small and may be smaller by a few order of magnitude. The gain curve may also decay as an exponential. This AGC control signal must be applied to an AGC amplifier in the receiver circuitry to assure receiver gain control.

Even though a generalized AGC gain control curve can be devised, that is not sufficient information. For instance, there may be a vertical crack or fissure adjacent to the borehole which will show up on a few revolutions as the tool moves up the well borehole. This will cause a quite large signal at some point during the decay curve. If the gain control responds excessively, the large peak may be completely suppressed and will not be sufficiently amplified. This is an undesirable result. On the other hand, if the AGC amplifier responds sluggishly, the amplifier may be overdriven into saturation. The amplifier in the receiver must therefore be provided with appropriate gain control throughout the response time after firing of the transmitter.

In general measure, if the lithography of the well is known, the AGC gain can be reshaped in advance. For instance, if it is known that the ultrasonic log is being formed in a sand formation as opposed to limestone, the general performance and response of the system can be known. To that end, preprogramming can be helpful to avoid overdriving or underdriving the receiver system. Programming will not capture signal dynamics such as those described above.

The present apparatus enables the wide ranging signals to be accomplished and to particularly provide an AGC control system which generates a sized or matched AGC control curve which takes into account the vagaries of the formation encountered and which also takes into account the data obtained from the previous full revolution of the ultrasonic transducer. In the latter event, it is assumed that adjacent revolutions will provide approximately similar dynamics of the data. Precise identity is not required; what is helpful, however, is the provision of an AGC control signal which is shaped somewhat by the prior revolution. One revolution however typically entails multiple pulses. In the preferred embodiment, the pulse identification number is readily handled as a digital word using the binary system. Accordingly, the full revolution (of rotation) is ideally divided into 256 or 512 increments. The latter gives a finer level of measurement or resolution. For each of the 256 or 512 angular positions, a transmitter pulse is formed and an AGC control curve is provided. One revolution (256 or 512 pulses) defines what is known as the A revolution. The next revolution, or the B revolution, serves as a good model for the gain for each pulse of the following or next revolution. In other words, the AGC signal for each pulse in one revolution is stored and is used as a model for the gain of the AGC amplifier during the next revolution. To be sure, while there will be differences from one revolution to the next, in general, the gain instructions and sequence for each of the pulses in a given revolution are quite similar to those in the prior revolution. As will be explained, for a particular pulse in a particular revolution, the prior revolution AGC signal serves as a useful and valuable predictor for the AGC control in the next following revolution at that particular pulse. In alternate embodiments, the prior N AGC settings (N is an integer) may be used to obtain an average.

The present apparatus is therefore summarized as a rotating ultrasonic transducer which is connected with a transmitter for periodic firing. It is fired by providing a procession of firing pulses to it from a transmitter. The transmitter is clocked so it operates in a timed sequence. One full revolution is divided into a specified number of transmitter pulses such as 512. These are spaced evenly in time so that they are transmitted in evenly spaced angular or rotational increments. With each rotation of the transducer, it forms pulses associated with firing. This enable synchronization of operation subsequently. The ultrasonic transducer is used to both transmit and receive, and the received signal is the return echo directed back to the transducer after transmission into the formations adjacent to the well borehole. The received signal normally decays over a period of time. An automatic gain control (AGC) signal is preferably used to control an adjustable gain amplifier connected to the transducer and operated during the receiver mode. The receiver is thus blanked or switched off during the firing of the transmitter and is switched on at some interval thereafter to receive the acoustic signal from the formation. This acoustic signal is received and digitized. This produces a remarkably large quantity of data, typically about 1.5 megabytes of data per second. The circuit thus includes an adjustable gain amplifier which connects with a synchronized analog to digital converter (ADC) and that forms the output which is delivered to a CPU so that it can be formatted and transmitted to the surface. The CPU is synchronized with the rotor so that the precise step in one revolution for each pulse is identified. In addition, there are duplicate A and B revolution signal buffers. While one is being filled with data, the data in the other is being used, and they then swap functions. Thus, each is filled and each is used for alternate revolutions of the transducer. Assuming that the transmitter is fired 512 times per revolution, this requires 512 addresses in each of the two buffers. The AGC control signal is input for each of the 512 pulse events. It is stored in one of the buffers while the other buffer is being used. In other words, 512 AGC signals for one revolution are written in one of the buffers in digital form and then the next revolution occurs while the next 512 AGC signals are written into that buffer. As will be seen, the data in first one buffer and then the other is used. Assume, as an example, that pulse 369 in a first revolution is associated with a particular gain for the AGC amplifier system. On the next revolution, pulse 369 causes interrogation of the data from the prior revolution at the common pulse location to obtain digital words representative of the particular gain setting; this utilizes the prior revolution corresponding data as a format for a subsequently occurring transmission. Clearly, the device is able to use the two buffers to store first one revolution and then the next, switching back and forth between the two buffers. Output of the data utilizes a downhole CPU which formats the measured received voltage as well as the digital word representative of the prior revolution to assure storage.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not be considered limiting of its scope, for the invention may admit to other equally effective embodiments.

The only view is a schematic block diagram of an AGC control system for a rotation transducer ultrasonic logging tool incorporating a gain control buffer and alternately using full revolution buffers for storing values of automatic gain control for use in subsequent revolutions of the transducer in the sonde.

DETAILED DESCRIPTION OF THE PREFERRED EMBODIMENT

Attention is now directed to the only drawing which illustrates a sonde 10 supported on a logging cable 12 which encloses one or more electrical conductors. The sonde 10 incorporates a shell o housing which encloses various components therein to be lowered into a well borehole 14. The well can be either open hole, cased or both. Typically, the sonde is lowered to the bottom of the well and then is retrieved on the logging cable. The logging cable includes multiple electrical conductors to convey signals out of the sonde 10 to the surface located equipment. The logging cable is several thousand feet in length, passes over sheave 16 located above the well head and extends to a storage reel or drum 18. The several conductors in the logging cable are connected with a data conditioning and control system 20 which includes the surface located equipment. This data is supplied to a recorded 22. The data is recorded as a function of depth in the well borehole. This is accomplished at the recorder. The recorder 22 is provided with an input signal from an electrical or mechanical depth measuring system 24 which operates from motion of the sheave 16.

Ordinarily, the sonde 10 is lowered to the bottom of the well and is retrieved while recording data as it traverses in the upward direction. This assures upward travel at a specified rate, and data is created during retrieval. The ultrasonic logging device incorporates within the sonde a telemetry system 30 which is connected with one or more conductors in the cable 12 to provide an output stream of data. There is a system clock 32 connected with the telemetry device and also with the transmitter 34. The clock also connects with other components as indicated at various parts of the circuit. The transmitter 34 forms spaced periodic output pulses. Typically, this has the form of an output pulse which is delivered from the transmitter 34 to an ultrasonic transducer 36. The ultrasonic transducer is used both as transmitter and receiver. It serves as an antenna to propagate an ultrasonic pulse outwardly from the sonde. It likewise functions as a receiver antenna to receive reflections from the adjacent formations. Accordingly, it is pulse operated as a transmitter, and the transmitter is switched off while the receiver is switched on. After an interval, the returned signal is formed by the transducer operating as a receiver. The system operates so that a transmitted pulse is formed for transmission along a certain azimuthal line. The next pulse is formed for transmission along the next and different azimuthal line. To this end, the transducer is rotated by a rotor which connects with a rotor and connected sensor 38. The rotor and sensor are preferably operated in step fashion. That is, the 360° involved in a single revolution are divided into increments or steps. While the circle can be divided into some arbitrary number such as 360 steps to the circle, it is desirable that the steps match in size and provide a specified number of steps. In the preferred embodiments, this is can be 256 steps and the preferred number is 512 increments. Thus, each step of rotative movement represents an angle of 360°/512 or each incremental step represents 0.703°. The numbers 256 and 512 are multiples of two and are easily encoded as binary data.

Assuming that one revolution occurs per second, this means that approximately 1,936 microsecond spacing from transmitter pulse to transmitter pulse. To avoid blasting the AGC amplifier system described later, there is a blanking circuit 40 which is keyed by the clock 32 and which blanks the connected circuitry. The purpose of this blanking is to avoid driving the AGC control amplifier into saturation during the formation of the transmitter pulse. Thus, in the foregoing example where the pulse spacing is 1,936 microseconds, the blanking circuit prevents transducer receiver operation for a selected few microseconds, leaving the remainder of the 1,936 microseconds thereafter for data collection. In that interval, the transmitted ultrasonic pulse from the transducer 36 propagates outwardly and forms an echo which is returned. As will be understood, the blanked interval can be adjusted for different intervals. In any case, since there is a need for blanking off the system, the blanking circuit 40 operates for a specified and selected interval to assure that no signal passes through it. When the interval clocks out, echoes at the transducer (a reflected signal) are converted by the transducer 36 and supplied to the AGC adjustable amplifier system to be described.

Again using an example time where the receiver circuit is blanked out for 136 microseconds, this leaves an additional 1,800 microseconds until the next adjacent pulse; the received signal is amplified during this interval. The received signal can be measured for peak value by sampling and holding; it can be measured for decay or it can be sampled at multiple times prior to the next transmitter pulse. In other words, the AGC amplifier system is operated to measure one or more samples per transmitter pulse. The automatic adjustable gain amplifier 42 is provided with a gain control signal discussed below. It forms an analog output (e.g., peak voltage) which is applied to an analog to digital converter 44 which forms a digital word representative of the analog value of the peak and that digital word is delivered to a CPU 48. The system further includes a gain control buffer 50 for holding a gain control setting in the form of a multi-bit digital word. This will be described in detail below. In addition, there are separate and duplicate buffers. They are labelled simply the A and B revolution buffers 52 and 54. They function in alternating fashion for alternate revolutions of the transducer.

The CPU 48 receives commands from the surface and delivers digital data back to the surface. All this operates by connection through the telemetry system 30 so that the signals can be provided on the logging cable 12 which includes the needed electrical conductors.

REPRESENTATIVE SEQUENCE OF OPERATION

First, one revolution is preferably defined as 512 increments of azimuth which can be conveniently represented by a nine bit word (ignoring sign or parity bits). After each transmitter pulse followed by the blanking operation for an exemplary time of about 136 microseconds, the received signal is sampled or measured. This provides a specific set of samples. For each transmitted pulse, the AGC amplifier 42 is provided with a gain control digital word consecutively delivered. These words provide gain control settings. This gain must be varied for two reasons. First, the acoustic pulse may encounter a void or space which completely absorbs the acoustic pulse, creating an abnormally small return echo. This will form a very small receiver signal peak. Secondly, the gain typically decays over a period of time through several orders of magnitude as the received echo dies away at the receiver. In other words, the gain of the adjustable gain amplifier 48 must increase substantially as the gain is thereby boosted by several orders of magnitude during the interval. The required gain setting is adjusted to meet the wide range of receiver signals. The gain setting is created in one of several ways discussed below.

VARIOUS GAIN SETTING PROCEDURES

Assume that only peak amplitude of the echo is wanted Assume further that the previous revolution encountered large peak return signals. This prior revolution (divided into 512 events) is the model for the next transducer revolution so that the 512 gain settings for the next 512 pulses are accompanied by AGC settings from the prior revolution. Assume as a different mode of operation that the AGC signal must drive the amplifier during an interval in which the received signal decays by a few orders of magnitude. In that event, the gain must increase by orders of magnitude which is signaled by the AGC input signal. This gain control signal input to the AGC 42 is obtained in the following fashion. Again assume that the system is operated for a first revolution. That is, 512 transmitter pulses are created. These transmitter pulse events are stored in the A buffer 52. For each transmitter pulse, there are multiple AGC control settings to amplify the decaying signal. The multiple AGC values are stored in sequence. If AGC is provided with four settings after transmission, one can presume that the received signal will die away at an exponential rate. For instance, the setting of the AGC might be adjusted by one thousand fold during the four steps. In other words, the AGC is adjusted approximately $10^3$. Each AGC setting can be encoded in the form of multiple bit digital words. The multiple bit word thus represents the stored gain for the buffer 50. Assume, for easy description, that the gain of the AGC amplifier 42 is one at the first sample of the received signal. Assume that the next sample gain is eight times and the next is 128 times. This sequence can proceed through the necessary steps up to a final relative gain much larger in comparision with a gain of one for the first sample.

In all cases, the AGC is provided with a gain control signal from the gain control buffer 50. That signal is delivered from the buffer 50 to the AGC 42 to set the gain. Of course, the AGC signal is also input to the CPU. Assume that the received output, digitized by the ADC 44, is within acceptable upper and lower limits. In that instance, the gain control signal for that particular digitization was acceptable. If the ADC outputs a signal which is too small, then the gain input for that particular digitization was too small, and the AGC 42 was provided with inadequate gain. The word input at that instant to the CPU from the buffer 50 was thus representative of too little gain; the CPU therefore increments that control word by increasing it by the appropriate additional amplification so that the ADC would operate so the amplified signal is within the desired and acceptable limits established for the ADC. Consider an example of operation. In one instance, assume that the gain is 1,024 and the output of the ADC is slightly too small. In that instance, the CPU 48 will adjust the stored gain to 2048. A digital word representative of a gain of 2,048 is thus generated and delivered for buffer storage. As a practical matter, the buffers 50, 52 and 54 are typically selected areas within a large buffer memory. The memory is addressed in the organized and addressed sections indicated in the drawing. The buffers can be therefore organized so that gain information is stored in the sequenced addresses.

VARIOUS SEQUENCES OF AGC CONTROL

In one routine, the storage sequence involves the use of the buffers 52 and 54 for alternate revolutions. Assume that one of the two buffers is filled with the 512 words representative of 512 gain settings for the AGC 42. While that buffer is filled for use during the next following revolution, the other of the two buffers can be treated as empty (data in each buffer is recorded during one revolutin, used in the next and then is erased or written over). In this example, assume that the first revolution has been recorded in the A buffer. The gain levels (all 512 settings) are used as a prototype for controlling the AGC 42. This provides sequentially the settings necessary for operation of the amplifier 42.

During the second revolution, the CPU will supply gain settings as received from memory and also adjusted as appropriate as described above. The second revolution gain settins are then input to the B buffer. They are stored, referring to all 512 settings in this example. For the alternate revolution, the gain settings from the B buffer are used for the gain control buffer 50. The buffer 52 is thus used to store the data from every other revolution while the buffer 54 stores the data for the alternate revolutions. The data from a prior revolution is used in the next revolution. By this sequence, and taking into account the close similarity from revolution to revolution, the gain control signals for the AGC 42 thus are provided with a high likelihood that the gain setting is proper to assure that the output signal is within accepted limits.

The foregoing sequence is used for each revolution. To this end, the clock preferably furnishes a pulse indicative of the start of each revolution so that the equipment can be switched whereby the next set of gain control words are written in the correct addresses for the two buffers 52 and 54. Gain control words are stored in one buffer and then the other and then the first. The sequential mode of operation assures proper operation of the buffered AGC control signals. Adjustments are made to take into account signal anomalies as might occur resulting from a vertical fissure or void in the formation. In any event, the sequential operation of gain control signals cyclically stored in alternate buffers enables the AGC 42 to be provided with a fairly accurate set of AGC instruction words.

The foregoing assumed that a first revolution was the best model for gain setting for the next revolution. Alternate models of gain setting can be used. Assume that peak voltage of the return is desired. Assume also that casing-cement bond voids are encountered in a region. It might be easier to use the gain of the previous N AGC setting to indicate the desired gain. In that instance, the relationship is not vertical but horizontal for the AGC control signal. This is implemented by the step of writing N AGC setting into the CPU and evaluating the entries. Typically, N is an integer representative of the prior acoustic pulses necessary to recognize a prevailing formation condition horizontally encircling all of part of the casing. As an example, the casing-cement bond can be broken at a region, partly or wholly around the casing.

To summarize, one approach uses the prior AGC settings for one revolution as the model for the next revolution, or it may be a vertical model. Another approach uses horizontally furnished data to model. Additional approaches can include patterned AGC control signals of various types.

When a particular received signal from the transducer 36 is digitized, the digital value formed by the ADC 44 and output to the CPU 48 is sent to the surface. That particular word partially describes the amplitude, but the amplitude is not complete unless the word is delivered along with the setting of the AGC amplifier 42. In other words, the two digital words are required to describe the actual instantaneous value. Assume that the ADC operates with eight bit digitization. In that instance, it will necessitate the transfer of the eight bits from the ADC, and the appropriate digital word representing the gain control setting for the AGC amplifier 42. The two words are thus transmitted as the data through the telemetry system 30. The two words may comprise as many as ten to fourteen bits with parity and sign bits. In summary, the digitized samples are send to the surface to represent the received echo.

Generally, the sonde is free to rotate in the well borehole. From one revolution to the next, the actual rotation is normally small or even nil. To the extent that rotation of the sonde hanging on the cable shifts the transducer in a fashion making AGC data stored in one buffer 52 or 54 less useful, the sonde can optionally include a direction measuring device 60 which provides a signal to the CPU 48. The device 60 can be a north locating gyroscopic system or accelerometer system. As the sonde rotates, this data is used in the CPU to shift in azimuth the data from one revolution to the next (referring to the buffered AGC data in the buffers 52 and 54). If, during the first transducer revolution AGC data is formed, it is determined that the sonde rotated by an angle $\alpha$, the AGC data is offset by the angle $\alpha$ to enable the AGC data to match vertically along the well borehole.

While the foregoing is directed to the preferred embodiment, the scope thereof is determined by the claims which follow.

What is claimed is:

1. A method of ultrasonic scanning formations along a well borehole comprising the steps of:
   (a) rotating an ultrasonic transducer to direct transmitted pulses therefrom along azimuthal directions to encompass an azimuthal sector in segments;
   (b) receiving an echo for a selected interval at the transducer after the transmittd pulse;
   (c) amplifying the received transducer signal through a gain controlled amplifier and;
   (d) providing a gain control signal to the gain controlled amplifier during a first revolution of said ultrasonic transducer wherein that revolution is divided into a set of intervals and forming a digital word representing the gain control value for particular intervals, and storing said first revolution gain control values in digital form, retrieving these values for corresponding intervals of the next following revolution, and applying the retrieved values to said gain control amplifier.

2. The method of claim 1 wherein each pulse formed for transmission occurs at a timed spacing from other transmitted pulses, and during the time between adjacent transmitted pulses, the received signal is amplified and digitized to form a digital word which word is associated with a digital word representing the gain control signal.

3. The method of claim 1 including providing first and second digital memories sized to receive and store a set of words representing the gain control signals for one revolution, and including the steps of storing words from first and third revolutions in the first memory, and the second and fourth revolutions in the second memory wherein (for both memories) subsequently occurring revolutions digital words are stored over previously stored words.

4. The method of claim 1 wherein said ultrasonic transducer is rotated at a fixed velocity and transmits tansmitter pulses therefrom with uniform spacing to direct said pulses in azimuth uniformly, and further including the step of periodically, in timed sequence, sampling the received signal from said ultrasonic transducer and wherein said ultrasonic received signal is first blanked off for a specified beginning interval before receiving echoes from the transmitted pulses.

5. The method of claim 1 including the steps of digitizing the amplified received signal and transmitting the digitized received signal from the well borehole.

6. The method of claim 1 including the step of buffering the gain control signal during a first revolution of the ultrasonic transducer, comparing the digitized, amplified received signal with upper and lower limits to determine whether or not the digitized received signal is within such limits, and modifying the gain control signal for that particular digitized received signal dependent on whether or not the data so obtained was within or without the specified limits, and based on that, modifying the gain control signal accordingly.

7. The method of claim 6 including the step of storing the modified gain control value signal.

8. The method of claim 1 including the step of digitizing the amplified received signal, comparing the value of the digitized signal with respect to upper and lower limits therefor, and modifying the gain control signal dependent on the comparison.

9. The method of claim 1 including the step of defining a time interval for which the received echoes from the ultrasonic transducer are observed;
   (a) defining an anticipated gain control signal for the timed interval;
   (b) utilizing the gain control signal for operation of the gain control amplifier for the timed interval; and
   (c) forming in digital form a gain control signal resultant from the signal used during the timed interval subject to modification dependent on the digitized values of the amplified received signal.

10. An apparatus for controlling ultrasonic inspection along a well borehole, comprising:
    (a) a rotatable ultrasonic transducer mounted on a cable supported sonde for moving along a well borehole;
    (b) a transmitter connected to said ultrasonic transducer for forming periodic transmitted pulses;
    (c) a gain controlled amplifier connected to said ultrasonic transducer to form an amplified output signal;
    (d) analog to digital converter means connected to said amplifier to convert the amplified signal into digital signals;
    (e) memory means for storing a gain control signal created for said gain control amplifier during a first revolution of said ultrasonic transducer; and
    (f) means connected to said memory means to receive therefrom the stored gain control signal for a first revolution and means for forming a gain control signal as a function of said stored gain control signal for the next revolution of said ultrasonic transducer.

11. The apparatus of claim 10 wherein said memory means is comprised of duplicate first and second memory means which are both arranged to receive at specified addresses therein digital values representing the gain control signal for said gain controlled amplifier, and further including a buffer register connected to receive individual gain control signal values therein.

12. The apparatus of claim 10 including a CPU provided with a gain control signal in digital form and which increments or decrements that signal based on the output of the analog to digital converter means to bring the modified gain control signal to a value which would otherwise cause the output of the analog to digital converter means to be within specified limits.

13. The apparatus of claim 10 wherein said memory means is organized to form a storage means for one revolution of said transducer having storage addresses therein for gain control signals.

14. The apparatus of claim 13 including a second storage means for a second revolution of said transducer for gain control signals of a second and following revolution.

15. The apparatus of claim 10 including means for determining a directional reference to enable said rotating transducer to be operated at specific directions in the well borehole.

* * * * *